United States Patent [19]

Kerrigan et al.

[11] Patent Number: 5,291,552
[45] Date of Patent: Mar. 1, 1994

[54] DISTRIBUTION OF CALLS AMONG AUTOMATIC CALL DISTRIBUTORS OF A SINGLE LARGE CUSTOMER

[75] Inventors: Daniel C. Kerrigan, Downers Grove; Mary R. Otto, Lisle, both of Ill.

[73] Assignee: AT&T Bell Laboratories, Murray Hill, N.J.

[21] Appl. No.: 738,003

[22] Filed: Jul. 30, 1991

[51] Int. Cl.$^5$ .................... H04Q 3/64; H04M 3/42; H04M 7/00
[52] U.S. Cl. ................................ 379/266; 379/207; 379/212; 379/220
[58] Field of Search ............... 379/265, 266, 309, 219, 379/220, 221, 207, 212

[56] References Cited

U.S. PATENT DOCUMENTS

| | | |
|---|---|---|
| 4,048,452 | 9/1977 | Oehring et al. ............... 179/27 D |
| 4,400,587 | 8/1983 | Taylor et al. .................. 179/27 D |
| 4,800,583 | 1/1989 | Theis ............................. 379/67 |
| 4,893,328 | 1/1990 | Peacock ......................... 379/67 |
| 4,907,260 | 3/1990 | Prohs et al. .................... 379/224 |
| 4,951,310 | 8/1990 | Honda et al. ................... 379/266 |
| 4,953,204 | 8/1990 | Cuschleg, Jr. et al. ......... 379/309 X |

Primary Examiner—James L. Dwyer
Assistant Examiner—Harry S. Hong
Attorney, Agent, or Firm—Werner Ulrich

[57] ABSTRACT

This invention relates to apparatus and methods for sharing traffic among a plurality of ACD sites serving a customer. Each ACD site has a main queue for storing incoming calls to that ACD, and a group of overflow queues for storing calls rerouted from one of the other ACD sites. Before rerouting a call to an alternate site, the overflow queue for that site is checked; if it has an excessive number of entries, calls will not be rerouted to that alternate site.

18 Claims, 3 Drawing Sheets

DISTRIBUTION OF CALLS AMONG AUTOMATIC CALL DISTRIBUTORS OF A SINGLE LARGE CUSTOMER

TECHNICAL FIELD

This invention relates to automatic call distributors (ACDs) or Private Branch Exchanges (PBXs) and, more specifically, to arrangements for sharing traffic among a group of such entities.

PROBLEM

Businesses frequently serve their customers through the use of automatic call distributor (ACD) answering sites which allows incoming calls, for example, for placing orders, to be routed to one of a plurality of agent positions for handling each call. In many cases, it is advantageous for a business to have several different ACD answering sites separated from each other for handling the overall needs of the business. The ACD sites may be separated from each other in order to draw on different populations for staffing the site or to be responsive to the special requirements of different regulatory agencies which control different areas of the country. When a single customer has several ACD sites, it is desirable to create an arrangement whereby overflow traffic to one of these ACD sites is handled by the agents of one of the other ACD sites that may be less busy.

Arrangements for handling such overflow exist in present systems such as the system described in M. P. Taylor et al.: U.S. Pat. No. 4,400,587. A problem with such an arrangement is that the control of rerouting of traffic is performed on the basis of an off/on trigger, not on the basis of a call by call examination of the expected delay in serving a call. For some situations such as night transfer, this is satisfactory but for the handling of overflow traffic, the result is that calls are answered with widely varying delay in the answer, with the result that some of the calls that are delayed excessively are abandoned, and others answered out of turn. A second problem is that these systems reroute calls after having first delayed them, thus causing such calls rerouted calls to encounter excessive delay.

Some systems are arranged to communicate only with similar types of ACD switches. For example, a Rockwell Galaxy ® ACD may communicate with another Galaxy ACD via control messages to determine if the second ACD is capable of accepting additional traffic. However, if the second ACD is not a Rockwell ACD but is, for example, an ACD served directly by an AT&T 5ESS ® switch, no arrangements have been made for communications between such switches. If the ACDs are connected by dedicated trunks, an expensive arrangement for handling occasional overflow traffic, then the availability of these trunks can be used as an indicator of the activity of other ACDs. The control messages only give an indication at one point in time of the ability of the other ACD to accept traffic. Further, the control messages require the use of a dedicated trunk, which is expensive.

These arrangements are particularly awkward when several ACDs attempt to handle overload that may exist in any one or more of the ACDs. First, any ACD must have a signaling trunk to any other ACD to which it may send traffic. Second, the time required for transmitting an inquiry message and receiving a response message is on the order of ten seconds so that if several different inquiries need to be made, a great deal of time is lost and a large amount of overflow traffic has been accumulated.

Accordingly, a problem in the prior art is that there is no good way of sharing overload among a group of ACD sites that is cost effective, allows for quick response to overload, and that is flexible and easily controllable by ACD system administrators.

SOLUTION

The above problem is solved and an advance is made over the prior art in accordance with the principles of this invention wherein the presence of overflow traffic is detected in the queues for storing incoming traffic to an ACD and, upon the detection of overflow, calls are rerouted to other ACDs of a group serving a specific customer; in a departure from the prior art, the calls are rerouted on the basis of information concerning traffic that has been rerouted from the target ACD to the sending ACD. Advantageously, only the rerouted calls and no special messages are transmitted between ACD sites.

Overflow in a sending ACD is determined by estimating the amount of time that an incoming call will be in a queue before being served by an ACD agent. In accordance with one specific implementation of this invention, this estimate is based on the number of calls in the queue and a running average, constantly updated, of the amount of time that agents spend on each call. Advantageously, such an estimate is more accurate than an alternative, the age of the oldest call in the queue; for example, that oldest call may be the first of a large block of calls which enter the system almost simultaneously so that this first call may be in the queue for only a short time but the last call of that block and any new calls will be in the queue for a long time before they are processed.

If the estimated time that a call is expected to be in the queue before the call is answered by an agent exceeds a parameter, preferably controllable by the ACD system administrator, an attempt is made to reroute the call to one of the other ACD answering sites of the customer. In selecting an alternate answering site, the sending ACD site queries its own incoming traffic queues for traffic rerouted from other answering sites in a predetermined but changeable order. If the amount of traffic in the queue of a candidate alternate answering site has fewer than a predetermined number of entries, then calls are rerouted to that alternate answering site. In one specific implementation, calls are rerouted only if that queue is actually empty.

In accordance with one aspect of the invention, if calls are rerouted to an alternate answering site and the alternate answering site cannot accept such calls, i.e., its calls would encounter more than the upper limit of delay if such a call were accepted, the alternate answering site reroutes the call back to the original ACD over a public switched network using a special directory number. An ACD which receives a call having this special directory number, recognizes that no calls can be overflowed to the sending ACD until all overflowed traffic from the alternate ACD serving site has been handled. Advantageously, by using a different directory number for rejected calls as opposed to overflowed calls, we avoid the situation of repeatedly or further rerouting rejected calls; further, since these rejected calls cannot be further rejected but must enter the overflow queue for the rejecting ACD site, we ensure that the sending ACD is properly informed that the target alternate ACD cannot accept traffic at this time.

DETAILED DESCRIPTION

Figure 1:
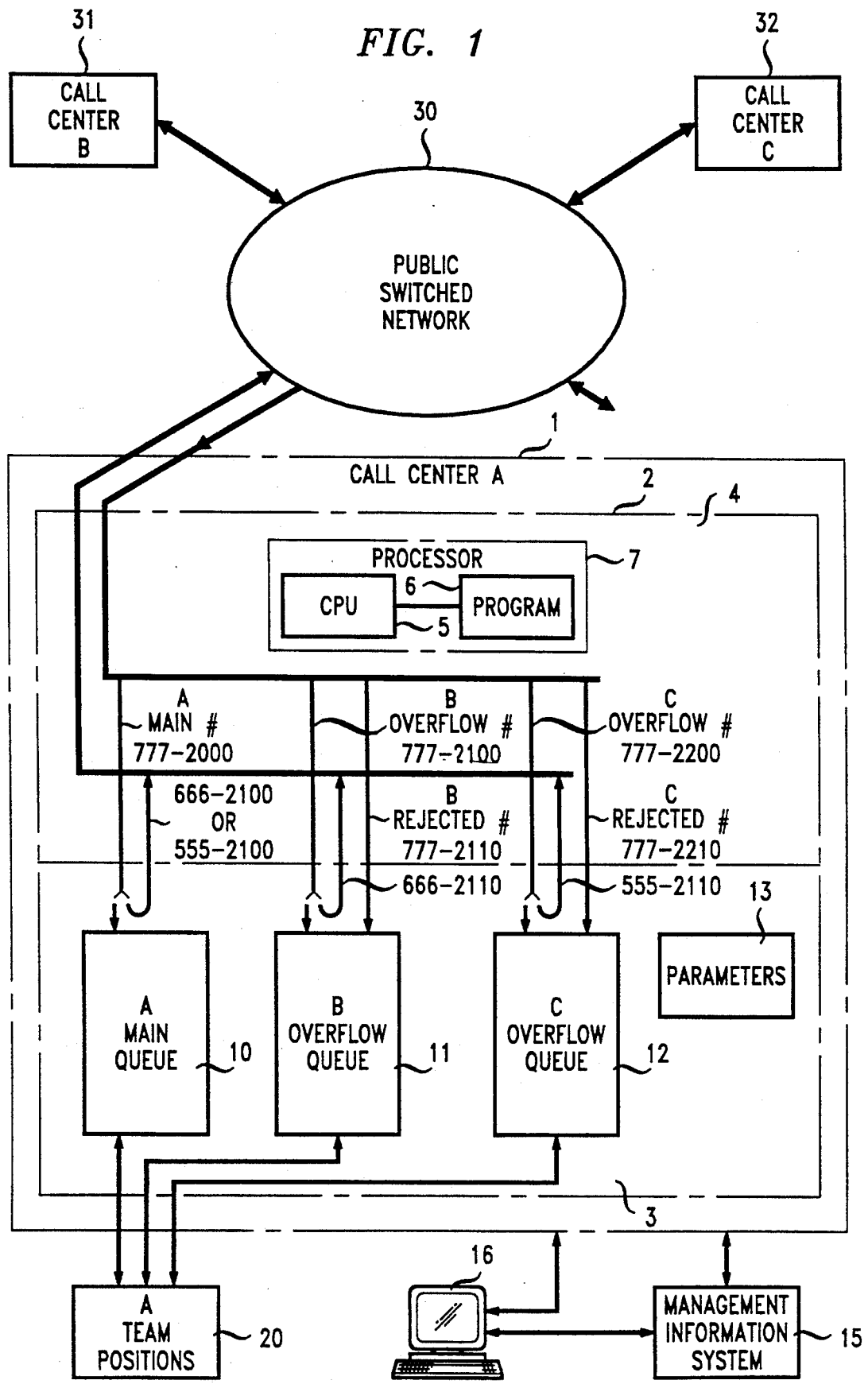
FIG. 1 illustrates one of a group of three or more automatic call distributors arranged to overflow traffic within the group.

FIG. 1 shows an ACD, served by switching system (switch) 1 comprising a team of positions 20, the A team which is one of three teams of positions that serves a particular customer. The other two teams, B and C, are connected via the public switched network 30 to switch 1. Switch 1 receives calls destined for the A team positions having one of five numbers: the main number 777-2000 for incoming traffic to the A team positions, the B team overflow number 777-2100 for traffic overflow from the B team targeted to the A team positions, the C team overflow number 777-2200 for traffic overflow from the C team targeted for the A team positions, 777-2110 for traffic originally rerouted from switch 1 but rejected by the switch controlling the B team positions, and 777-2210 for traffic originally rerouted from switch 1 but rejected from the switch controlling the C team. The latter two categories consist of calls originally having directory number 777-2000. If a call with the number 777-2000 comes into switch 1, it is examined within processor 2 comprising memory 3, of switch 1, the memory including the A main queue 10, the B overflow queue 11, and the C overflow queue 12. If the call can be served from the A team positions, then the call is entered into the A main queue 10. If not, the call is rerouted to an ACD serving center of either the B or the C team positions. In order to direct the call to the appropriate one of these ACD serving centers, the call is directed using a different number, 666-2100 and 555-2100 respectively for the B and C teams, for each such serving center. Overflow calls from the B or C centers rejected by call center A, are rerouted to the source center using directory numbers 666-2110 or 555-2110, respectively.

ACDs are well known in the prior art. The 5ESS switch ACD is described in "5ESS Switch Pinnacle ™ ACD Application Guide" and in "5ESS Switch Pinnacle ™ ACD Marketing Application Guide" available from AT&T Network Systems.

The ACD is controlled by a program controlled processor 7 comprising a central processing unit (CPU) 5 and a program 6 stored in memory. Other portions of memory include block 3 which includes queues and parameters described below.

If the ACD serving center serving the A team wishes to overflow traffic to the B team positions, then it sends such traffic over the public switched network identified by a special directory number 666-2100 (comparable to the 777-2100 number in the reverse direction) to identify to the switch serving the B team that the call has been overflowed from the A team ACD. Before doing so, the overflow queue 11 for overflow traffic from the B team is examined to see if traffic can be overflowed to the ACD for the B team. A check is made of whether the number of calls in queue 11 (the queue for the B team) is equal to or less than some parameter X, stored in memory location 13. This parameter X in one specific embodiment is simply 0, i.e., calls will only be sent to alternate sites if there are no calls in the queue from a given alternate site. For other situations, a different parameter such as 1 or 2 may be used. This parameter is controllable by a system administrator of the automatic call distributor. If the number of calls in the queue for the B team ACD is less than or equal to X then the call is routed to the B team ACD, using the telephone number 666-2100. At the B team ACD, such a call, corresponding to a call to 777-2100 or 777-2200 arriving at call center A, is recognized as being a call overflowed from call center A. If that call is rejected, it is rerouted to call center A using telephone number 777-2110. Rejected phone calls are not further rerouted in this arrangement, in order to avoid any necessity for specifically identifying individual calls which is difficult if common channel signaling is not used.

If the call center B overflows traffic to call center A, the overflow traffic uses directory number 777-2100, which identifies the source as B. If the B overflow call would encounter excessive delay in call center A, the call is rejected and rerouted to call center B using directory number 666-2110, which identifies the rejected call to call center B as being a call rejected by call center A. Calls rejected from call center C are rejected using directory number 555-2110.

A management information system (MIS) 15 is attached to call center A to provide information about the load applied to and the service provided by call center A. MISs for ACDs are well known in the prior art. Performance of the group of ACDs can be monitored by sending data messages periodically among the MIS of the different members of the group. A system administrator accesses data from the MIS and controls parameters 13.

Figure 2:
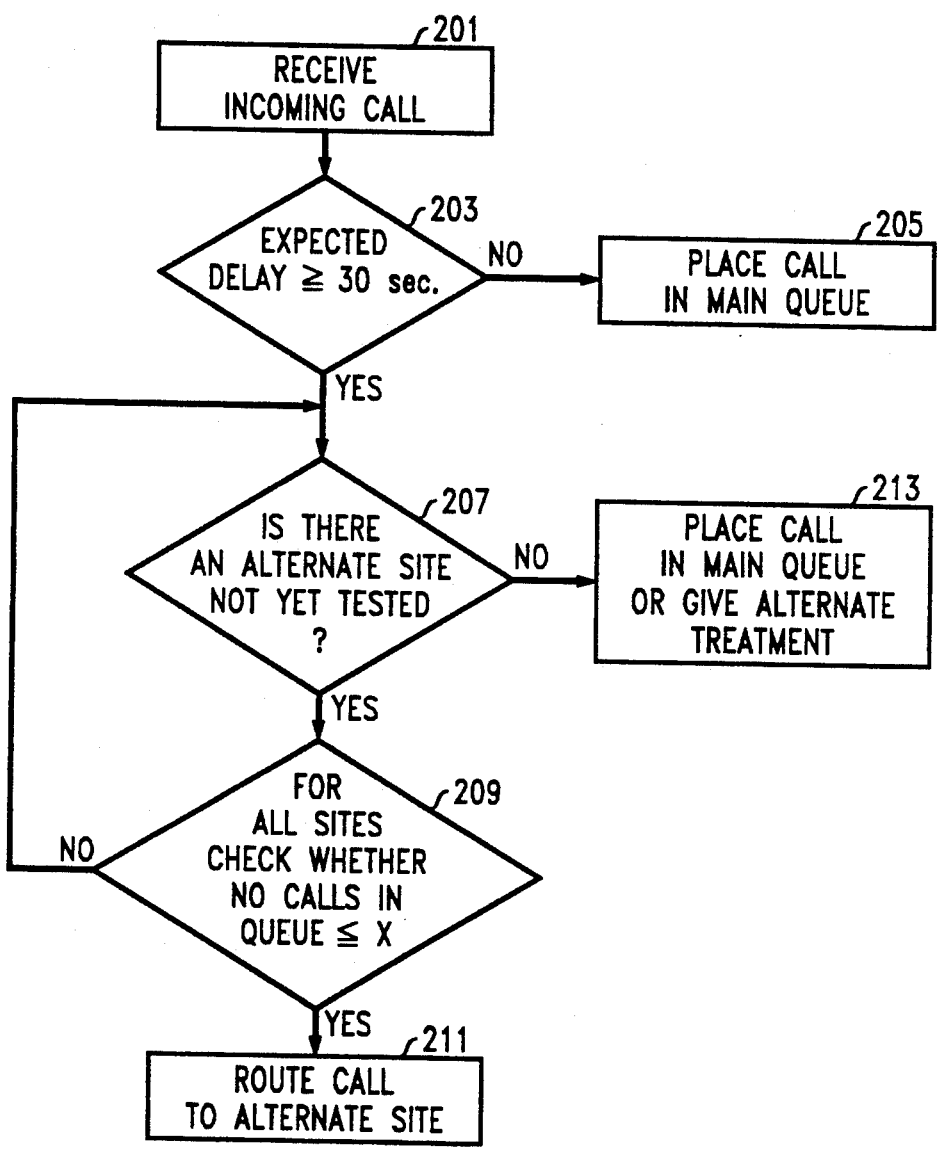
FIG. 2 is a flow diagram of the processing of an incoming call to one of these automatic call distributors.

FIG. 2 illustrates the process of receiving a call. The call is received in the switch for serving the ACD (action block 201). While in this embodiment, this switch is part of a local switching system, in other embodiments it can be part of a separate PBX. Test 203 is used to determine whether the expected delay is equal to or greater than a parameter, in this example, 30 seconds. This parameter is controllable by an ACD system administrator. If not, the call is placed in the main queue (action block 205). If the delay is excessive, then the loop which includes test 207 and 209 is entered. Test 207 is used to check whether there are any alternate sites that have not yet been tested to see if traffic can be overflowed to that site. If there are untested sites, then test 209 is used to determine if the specific alternate site being tested has no more than X calls in the overflow queue for that site. If not, test 207 is reentered. If a given alternate site being tested has no more than X calls in its queue, then the incoming call is rerouted to that alternate site (action block 211).

The number X in the most straightforward implementation is 0. In this case, no traffic is overflowed to an alternate site which has traffic overflowed to this ACD. However, as experience is gathered, it may be desirable to make this number some small positive number, such as 1 or 2, especially for large ACD sites. The number is controllable by an ACD administrator. Calls are rerouted using an ACD reroute feature and a routing index. The routing index can specify a telephone number or a trunk group. Rerouting, which is well known in ACDs, differs from call forwarding in that a rerouted call can be terminated on any available agent position. The reroute feature in the Pinnacle system is called the Call Vectored Reroute feature. If the alternate site tested in test 209 has too many calls in its queue, then test 207 is reentered to try other alternate sites. After all alternate sites have been tested without finding any alternate site having sufficiently few entries in its queue, then the call is either placed in the main queue or given alternate treatment (action block 213). The alternate treatment might be busy signal or some special queue provided in the hope that the customer may be willing to wait a longer time.

Figure 3:
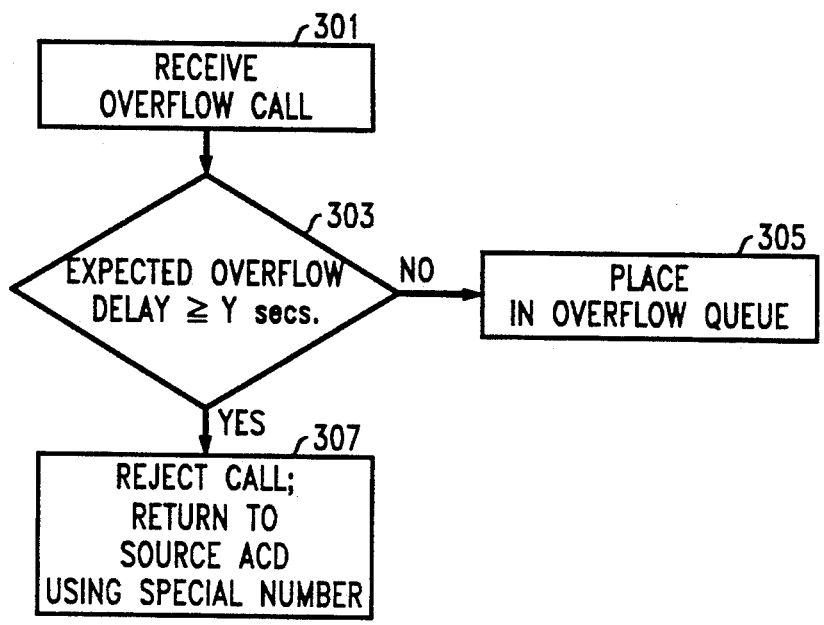
FIG. 3 is a flow diagram illustrating the processing of a call overflowed from another ACD.

FIG. 3 is a flow diagram of actions performed in response to receiving overflow traffic from one of the other ACD serving sites. As mentioned previously, such overflow traffic is identified by a different telephone number for identifying the source. An overflow call is received and its source identified (action block 301). Test 303 determines whether the delay in handling that overflow call is likely to exceed a threshold of, for example, Y seconds. Y is a parameter stored in block 13 of memory (FIG. 1). This threshold might be 25 seconds if the threshold for the main queue is 30 seconds to account for the fact that time has elapsed in routing the call from an original main number to an overflow ACD site. If the expected delay in serving that call is less than Y seconds, then the call is placed in the overflow queue associated with the transmitting ACD serving site (action block 305). If the expected overflow delay equals or exceeds Y seconds, then the call is rejected and is returned to the source ACD serving site using a special telephone number to identify that this is a rejected call and to identify the source (action block 307).

Figure 4:
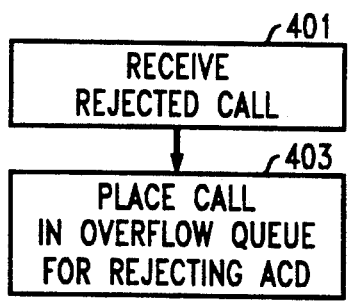
FIG. 4 is a flow diagram of the processing of a rejected call.

FIG. 4 is a flow diagram describing the processing of rejected calls. If a rejected call is received and the rejecting source identified (action block 401), then the call is placed in the overflow queue for the ACD serving site that has rejected the call (action block 403). Note that block 403 corresponds to block 305, not block 301 (which uses a test before inserting the call into the queue).

In one simple implementation of applicants' invention (test 209, FIG. 2), the presence of overflow and rejected calls yields the same result, i.e., a refusal to overflow calls to the ACD serving site associated with that queue if more than X calls have been rejected by or overflowed from that site. In alternative arrangements, the decision on whether or not to use a particular alternate destination can be based on one threshold for rejected calls from that destination and a second different threshold for calls overflowed from that destination, or on some combined threshold based on different weighting of the two types of calls.

The priority of the overflow queues and the main queue is different in order to allow overflow queue entries to be processed more rapidly since overflow queue entries have already encountered delay before entering a queue. Techniques for giving different queues different priorities are well known in the prior art. The system administrator can alter queue performance by specifying parameters, stored in memory location 13, for controlling the queues.

While this specific embodiment is of an Automatic Call Distributor, any other arrangement for distributing calls to serving agents, such as a Uniform Call Distributor, can also use this arrangement. This invention therefore applies to all types of call distributors (CDs).

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of serving calls to a customer having a plurality of call distributor (CD) serving centers, comprising the steps of:

receiving a call in one center of said serving centers;

testing whether delay for serving said call in said one center is expected to exceed a first threshold;

responsive to determining that said first threshold is expected to be exceeded, determining whether an excessive number of calls have been rerouted to said one center, said excessive number indicating inability to handle additional calls without unacceptable delay in said alternate center; and from an alternate center; and if an excessive number of calls has not been rerouted to said one center from said alternate center, rerouting said call to said alternate center;

wherein overflow calls are automatically rerouted to an alternate center which is not likely to be overloaded without requiring any call routing control messages, reflecting a level of busyness of a serving center, to be transmitted among said plurality of serving centers.

2. The method of claim 1 further comprising:

receiving in said one center a rerouted call from said alternate center;

testing whether delay for serving said rerouted call from said alternate center is expected to exceed a second threshold;

responsive to determining that said second threshold is expected to be exceeded, rejecting said rerouted call by rerouting said rerouted call back to said alternate center.

3. The method of claim 2 wherein said one center comprises an overflow queue for storing overflow calls routed from said alternate center, further comprising:

storing a rejected call from said alternate center in said overflow queue, said rejected call being a call originally rerouted from said one center to said alternate center.

4. The method of claim 2 wherein said rejecting comprises rerouting said call to said alternate center over a public switched network using a telephone number different from a main telephone number of said alternate center.

5. The method of claim 1 further comprising the step of:

responsive to receiving a rejected call from another alternate center, said rejected call being a call originally rerouted from said one center to said another alternate center, storing an indication that calls should not be rerouted to said another alternate center while said rejected call is queued for service.

6. The method of claim 5 wherein said one center comprises an overflow queue for storing overflow calls routed from said another alternate center, further comprising:

storing a rejected call in said overflow queue.

7. The method of claim 1 wherein said determining whether an excessive number of calls have been rerouted comprises:

testing whether more than a predefined number of unserved calls in said one center have been rerouted from said alternate center.

8. The method of claim 7 wherein said one center has overflow queues for ones of said plurality of CD serving centers and wherein said determining an excessive number of calls comprises determining how many calls are in an overflow queue for said alternate center.

9. The method of claim 1 wherein said rerouting comprises rerouting over a public switched network.

10. The method of claim 9 wherein said rerouting over a public switched network comprises rerouting over said network using a telephone number different from a main telephone number for said alternate center.

11. A call distributor (CD) connectable to at least one other CD, comprising:
   queue means for storing calls overflowed into said CD from said at least one other CD and for identifying a CD from which a call has been overflowed;
   means for estimating whether expected delay in serving an incoming call exceeds a threshold;
   means responsive to estimating delay exceeding said threshold for examining said queue means to identify one of said at least one other CD which has overflowed relatively few calls to said CD, said relatively few calls indicating the identified CD is not overloaded; and
   means responsive to said examining means for rerouting said call to the identified CD;
   wherein overflow calls are automatically rerouted to one of said at least one other CD which is not likely to be overloaded without requiring any call routing control messages, reflecting a level of busyness of said CD, to be transmitted among said CD and said at least one other CD.

12. The CD of claim 11 further comprising:
   means for receiving a call rerouted from one of said at least one other CDs;
   means for estimating whether expected delay in serving said rerouted call exceeds another threshold; and
   means responsive to estimating delay exceeding said another threshold for rejecting said rerouted call by rerouting said rerouted call back to said other CD.

13. The CD of claim 12 further comprising:
   means responsive to receiving a rejected call for storing an indication that calls should not be rerouted to an CD that rejected said call while said rejected call is queued for service.

14. The CD of claim 13 further comprising:
   overflow queue means for storing overflow calls and rejected calls.

15. The CD of claim 12 further comprising:
   overflow queue means for storing overflow calls and rejected calls.

16. The CD of claim 11 wherein said examining means comprises means for testing whether any unserved calls in said CD have been rerouted from a candidate for identification as said identified CD.

17. The CD of claim 16 wherein said means for examining further comprises means for testing how many calls have been overflowed from others of said at least one other CD.

18. The CD of claim 11 wherein said means for rerouting comprise means for rerouting over a public switched network.

* * * * *

UNITED STATES PATENT AND TRADEMARK OFFICE
CERTIFICATE OF CORRECTION

PATENT NO.  : 5,291,552

DATED       : March 1, 1994

INVENTOR(S) : Daniel C. Kerrigen, Mary R. Otto

It is certified that error appears in the above-identified patent and that said Letters Patent is hereby corrected as shown below:

Column 6, claim 1, line 17, after "center" and before the comma insert --from an alternate center--.

Column 6, claim 1, line 19, delete "from an".

Column 6, claim 1, line 20, delete "alternate center; and".

Signed and Sealed this

Twentieth Day of September, 1994

Attest:

BRUCE LEHMAN

Attesting Officer

Commissioner of Patents and Trademarks